United States Patent
Nainar et al.

(10) Patent No.: US 11,405,299 B2
(45) Date of Patent: Aug. 2, 2022

(54) DETERMINING NODE BEHAVIOR IN DETERMINISTIC NETWORKS

(71) Applicant: Cisco Technology, Inc., San Jose, CA (US)

(72) Inventors: Nagendra Kumar Nainar, Morrisville, NC (US); Carlos M. Pignataro, Cary, NC (US); Pascal Thubert, Roquefort les Pins (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/892,210

(22) Filed: Jun. 3, 2020

(65) Prior Publication Data

US 2021/0385148 A1    Dec. 9, 2021

(51) Int. Cl.
*G06F 15/16* (2006.01)
*H04L 43/12* (2022.01)
*H04L 43/0817* (2022.01)

(52) U.S. Cl.
CPC .......... *H04L 43/12* (2013.01); *H04L 43/0817* (2013.01)

(58) Field of Classification Search
CPC ..................... H04L 43/12; H04L 43/0817
See application file for complete search history.

(56) References Cited

U.S. PATENT DOCUMENTS

| | | | | |
|---|---|---|---|---|
| 10,181,997 B2* | 1/2019 | Joseph | ..................... | H04L 43/12 |
| 10,666,775 B1* | 5/2020 | Volpe | ..................... | H04L 43/50 |
| 10,805,199 B1* | 10/2020 | Ramabadran | ........... | H04L 43/12 |
| 10,897,524 B1* | 1/2021 | Volpe | ..................... | H04L 43/106 |
| 2002/0013831 A1* | 1/2002 | Astala | ................... | H04L 63/105 709/220 |
| 2013/0091556 A1* | 4/2013 | Horn | ....................... | H04W 4/00 726/4 |
| 2013/0336128 A1* | 12/2013 | Shaw | ...................... | H04L 43/12 370/241.1 |
| 2015/0049601 A1* | 2/2015 | Bugenhagen | ........... | H04L 43/08 370/241.1 |
| 2016/0100378 A1* | 4/2016 | Chang | ................... | H04W 48/16 455/456.5 |
| 2017/0086082 A1* | 3/2017 | Narayanan | .......... | H04L 41/0668 |
| 2017/0086083 A1* | 3/2017 | Narayanan | ............ | H04W 24/06 |
| 2017/0295101 A1* | 10/2017 | Hira | ..................... | H04L 43/0876 |
| 2021/0204154 A1* | 7/2021 | Li | ....................... | H04L 41/5054 |

* cited by examiner

*Primary Examiner* — Nicholas R Taylor
*Assistant Examiner* — Thorne E Waugh
(74) *Attorney, Agent, or Firm* — Lee & Hayes, P.C.

(57) ABSTRACT

This disclosure describes techniques for monitoring expected behavior of devices in a computing network. Behavior of network devices may include performing various functions associated with transferring data packets through the computing network. Monitoring expected behavior may include sending a probe packet into the computing network, and determining whether network devices behave as expected with respect to the probe packet. In some examples, behaviors such as replicating, forwarding, eliminating, ordering, and/or other functions regarding data packets may be validated using the present techniques. As computing networks and/or operations become more complex, assuring the expected behavior of network devices may become more important for the continued efficient, smooth, successful, and/or timely flow of data traffic.

20 Claims, 12 Drawing Sheets

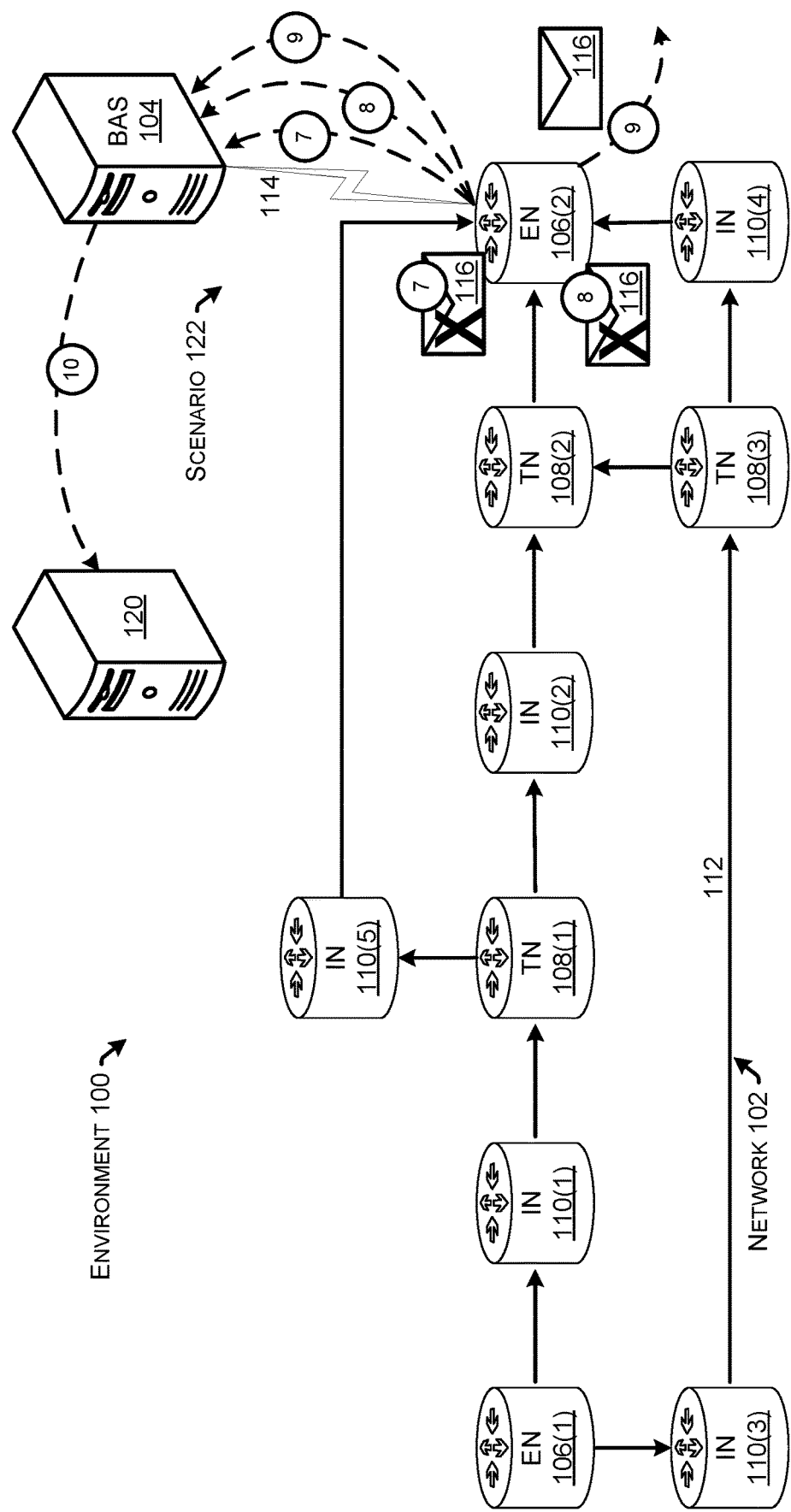

DETERMINING NODE BEHAVIOR IN DETERMINISTIC NETWORKS

TECHNICAL FIELD

The present disclosure relates generally to determining node behavior in deterministic networks, thereby improving computing network operations.

BACKGROUND

In some cases, a computing network may be designed and/or operated according to principles of Deterministic Networking (DetNet). DetNet may be used to carry application data traffic that may have stringent service level agreement (SLA) requirements, such as real-time network services that may demand low data loss, low jitter, and/or controlled latency. Some example network services that may benefit from DetNet include streaming media services, industrial automation, vehicle control, and emergency calls. DetNet devices may be configured with behaviors such as packet replication, elimination, and/or ordering functions (e.g., PAREO, PREOF) for data handling. Using PREOF, a packet replication function may replicate data packets over different path segments. Packet elimination may avoid duplication by eliminating redundant packets at a merge point. Packet ordering function may be responsible for delivering packets in appropriate order. Furthermore, PREOF may be extended with additional behaviors (e.g., overhearing) to expand the application of the DetNet devices and/or architecture, such as for wireless applications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIGS. 1A-1E illustrate component diagrams with example scenarios in which behavior assurance techniques may be performed as part of communications between network devices, in accordance with the present concepts.

DESCRIPTION OF EXAMPLE EMBODIMENTS

Overview

Figure 1A:
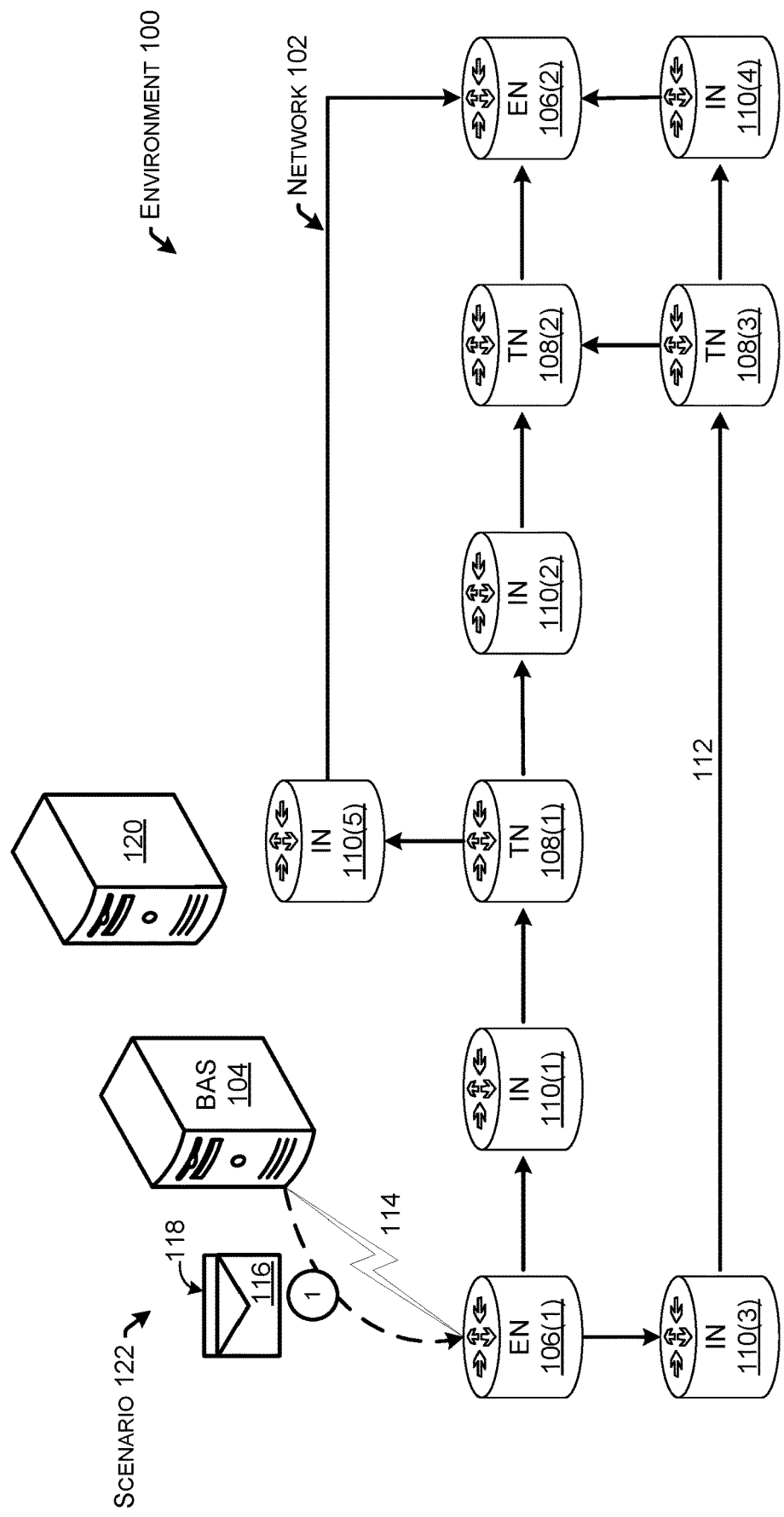

This disclosure describes, at least in part, a method that may be implemented by an operations, administration, and management (OAM) server communicatively coupled to one or more network devices. The method may include generating a data plane probe packet with a header including one or more segment identifiers (SIDs) corresponding to one or more network devices of the computing network. The one or more SIDs may correspond to an instruction for the one or more network devices to send a data plane message to the OAM server indicating an operation performed on the data plane probe packet, for instance. The method may also include sending the data plane probe packet to at least one of the one or more network devices via a bidirectional data plane channel for transport through the computing network. Further, the method may include receiving the data plane message from the one or more network devices of the computing network via the bidirectional data plane channel. In some examples, the data plane message may indicate the operation performed by the one or more network devices on the data plane probe packet. The method may also include comparing the operation with a predefined operation associated with the one or more network devices to determine an operational status of the computing network.

This disclosure also describes, at least in part, another method that may be implemented by a first network device communicatively coupled to a second network device and an OAM server. The method may include receiving, at the first network device via a computing network, a data plane probe packet. The method may also include identifying, from a header of the data plane probe packet, a segment identifier (SID) corresponding to an instruction for the first network device to send a message to the OAM server indicating an operation performed on the data plane probe packet by the first network device. Further, the method may include performing the operation on the data plane probe packet, and may include forwarding the data plane probe packet to a second network device via the computing network. In some examples, the method may include generating the message that indicates the operation performed on the data plane probe packet. Additionally, the method may include sending the message to the OAM server over a data plane channel.

Additionally, the techniques described herein may be performed by a system and/or device having non-transitory computer-readable media storing computer-executable instructions that, when executed by one or more processors, performs the method described above.

Example Embodiments

This disclosure describes techniques for behavior assurance in a computing network. Behavior of network devices may include performing various functions associated with transferring data packets through the computing network. In many cases, successful network operations depend on the network devices performing functions as expected. As computing networks and/or operations become more complex, assuring the expected behavior of network devices may become more important for the continued efficient, smooth, successful, and/or timely flow of data traffic. The behavior assurance techniques described herein may assist continued successful network operations by monitoring and/or determining whether network devices are properly executing expected functions.

In some implementations, behavior assurance may be performed by a computing device (e.g., server) without interrupting ongoing network operations of a computing network and/or consuming excessive network resources. For example, a behavior assurance server may be designated to monitor network operations without affecting the timely flow of data traffic and/or otherwise affecting a service being provided by the computing network. To assure expected functions are being performed, the behavior assurance server may exchange one or more probe packets, messages, and/or other information with devices of the computing network. In some examples, the behavior assurance server may send a probe packet to an individual device. The behavior assurance server may monitor the individual device, another individual device, and/or other devices of the computing network to determine whether an expected function is performed by the device regarding the probe packet, such as replicating the probe packet. In an instance where the device performs the expected function regarding the probe packet (replicating the probe packet in this case), the behavior assurance server may take no further action. In another instance where the device does not perform the expected function, the behavior assurance server may take further action to assure continued successful network operations. Such actions may include alerting a controller to the potential operational issue, further monitoring, further testing, rerouting data traffic to avoid the allegedly misbehaving device, etc.

In some examples, behavior assurance techniques may be performed within a deterministic networking (DetNet) architecture and/or scenario. In some cases, DetNet may be used in scenarios where packet loss would be particularly problematic. In some scenarios, such as emergency calls, surgery support services, etc., potentially every packet and/or byte matters. In such examples, it may be critical to ensure that network devices are performing as expected so that (potentially) every packet is delivered. As such, behavior assurance may include monitoring data handling functions performed by "DetNet devices." DetNet may be viewed as an overlay technology imposed on a computing network, with at least some devices designated as DetNet devices within the DetNet architecture and/or scenario. In some examples, DetNet devices may handle data traffic using packet replication, elimination, ordering, overhearing functions, and/or other functions (e.g., PAREO, PREOF). In this description, "PREOF functions" will be used to refer to any of a wide variety of existing and/or as-yet to be created data handling functions (e.g., behaviors) performed by DetNet devices in a DetNet architecture and/or scenario. Note that a DetNet architecture may include DetNet devices and also other devices that may function as traditional network nodes (e.g., non-DetNet devices). Additionally, behavior assurance techniques may be applied to other computing networks that are not specifically DetNet, but in which nodes perform similar operations (e.g., replication, elimination, ordering, overhearing, etc.) to those described herein for DetNet.

As used herein, a DetNet device (e.g., DetNet router, DetNet server) may be any of a variety of network devices configured to exchange communications (e.g., packets, messages) via a network connection. Further, a behavior assurance server may be a DetNet device. The network connection may be a transport control protocol (TCP) network connection or any network connection (e.g., Cisco information-centric networking (ICN)) that enables the networks devices to exchange packets with each other. For example, a DetNet device may be a computer, server, router, switch, endpoint, border device, gateway, laptop, mobile device, tablet, etc., that is configured to provide data and/or participate in a network service. The DetNet device may communicate with other DetNet devices and/or non-DetNet devices. The DetNet device may or may not be a producer, a point of generation and/or origination of data traffic. For instance, the data may originate elsewhere for the server device to be able to provide to a user device. Alternatively or additionally, the data may pass through another network device (e.g., router, switch) on a path from a server device to a user device.

Behavior assurance techniques may be designed with the flexibility to monitor increasingly complex architectures, such as mesh structures and/or wireless scenarios, and/or increasingly complex applications. In some implementations, behavior assurance techniques may include using a software defined networking (SDN) solution to validate PREOF functions. The monitoring may be performed using a behavior assurance channel and/or a behavior assurance server, for instance. One example behavior assurance channel for monitoring data handling may include an operations, administration, and management (OAM) channel between DetNet devices of a computing network. The OAM channel may be stateless. The OAM channel may be bidirectional, including ingress and egress paths to a computing network. An example behavior assurance server may be a centralized OAM server for validating DetNet data handling behavior, such as PREOF functions. Additionally or alternatively, in order to help avoid interfering with the operation of DetNet devices and/or a provided service, behavior assurance techniques may be accomplished without control plane involvement from the DetNet devices. In some examples, novel semantic concepts may be used to support behavior assurance in the data plane of a DetNet architecture and/or scenario. For instance, semantics programmed at the behavior assurance server and/or DetNet devices may encode and/or embed behavior assurance information in a probe packet that is sent through the computing network. The encoded behavior assurance information may indicate to the behavior assurance server whether DetNet devices completed expected data handling functions.

In some implementations, behavior assurance techniques may be used in a computer network with a mesh structure, such as connected grid mesh (CGM). An example use of a CGM-type network includes advanced metering infrastructure (AMI) and/or automated meter reading (AMR) networks for collecting data. Behavior assurance in such mesh-structure networks may help toward improving operating performance as more aspects of such systems become automated. For instance, DetNet data handling may be employed over a multi-hop, wireless mesh, an application that typically involves a controller. However, in some cases, a wireless mesh may be low speed and many (e.g., 20) hops deep. Such complexity may present operational issues. For instance, routing across such a wireless mess may not be able to resolve a serial A→B→C→D path at each fluctuation of the wireless medium, at any hop, and/or to monitor a current state of projected route at each individual hop. In some cases, a solution may be to split the functionality, delegating a load that requires rapid interactions and multiple exchanges to the mesh nodes themselves. The behavior assurance techniques described herein may enable a behavior assurance server that is located at or proxied by the root to monitor data handling with minimum signaling, using a novel delegated behavior assurance model, for instance.

To summarize, a more efficient technique for assuring behavior among network devices may be able to improve network operations. Monitoring and/or determining whether network devices are properly executing expected functions can help prevent and/or diagnose potential service slowdowns and/or interruptions. Furthermore, a behavior assurance technique may be viewed as a lightweight mechanism for assuring successful network operations, featuring both relatively low computational cost and relatively low bandwidth usage.

Although the examples described herein may refer to a DetNet device as performing service assurance techniques, the techniques can generally be applied to any device in a network. Further, the techniques are generally applicable for any network of devices managed by any entity where virtual resources are provisioned. In some instances, the techniques may be performed by SDN, and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
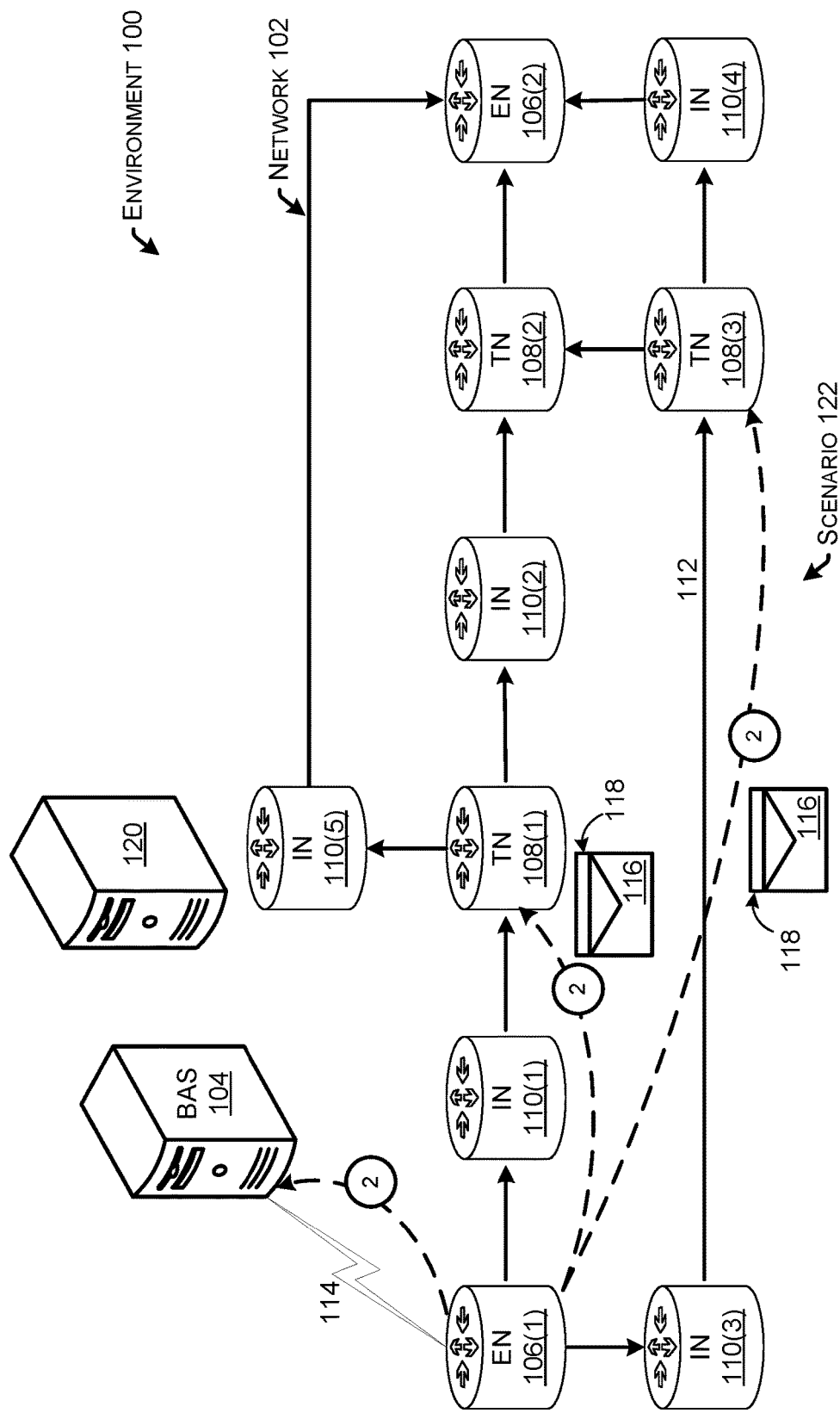
Figure 1C:
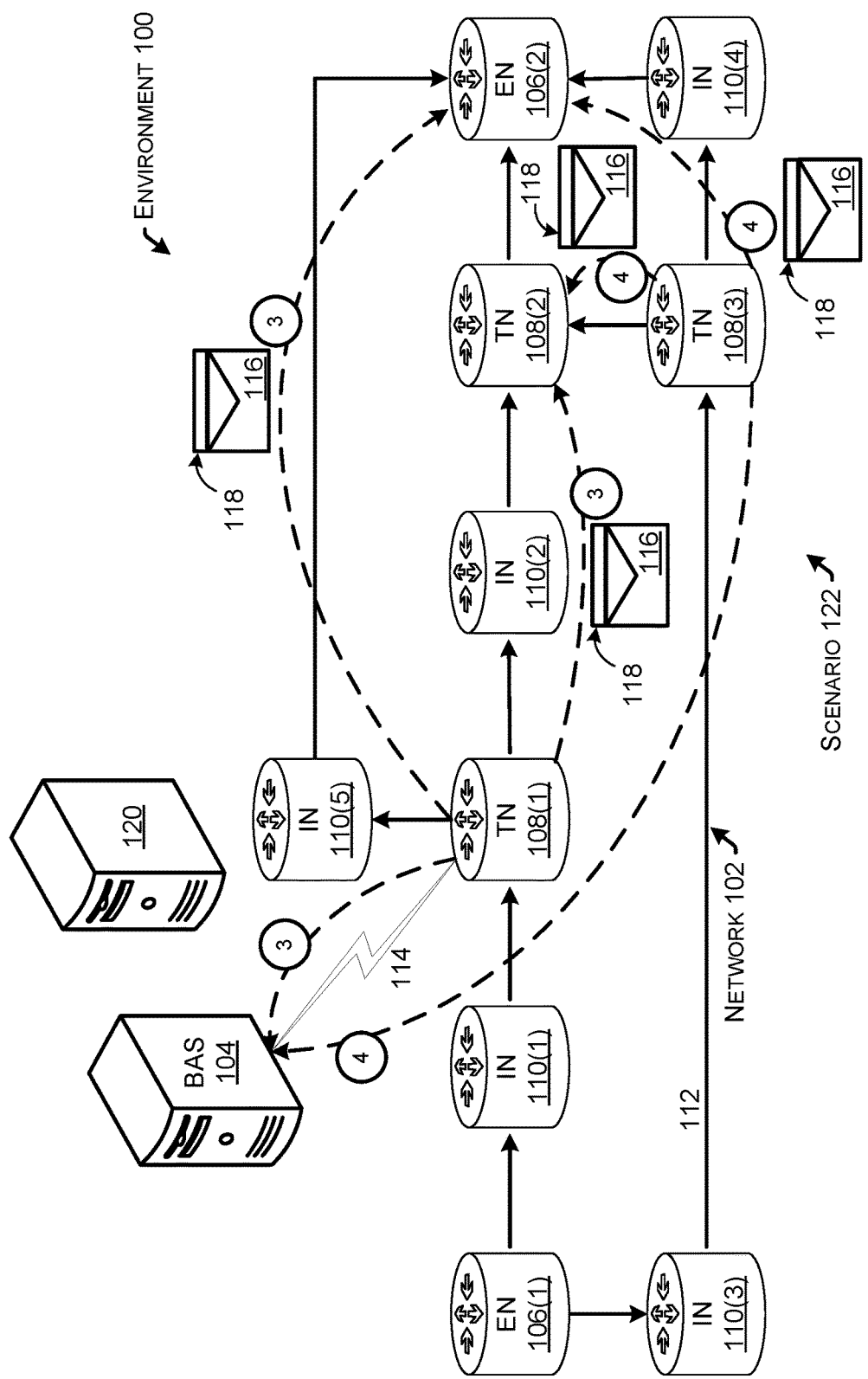
Figure 1D:
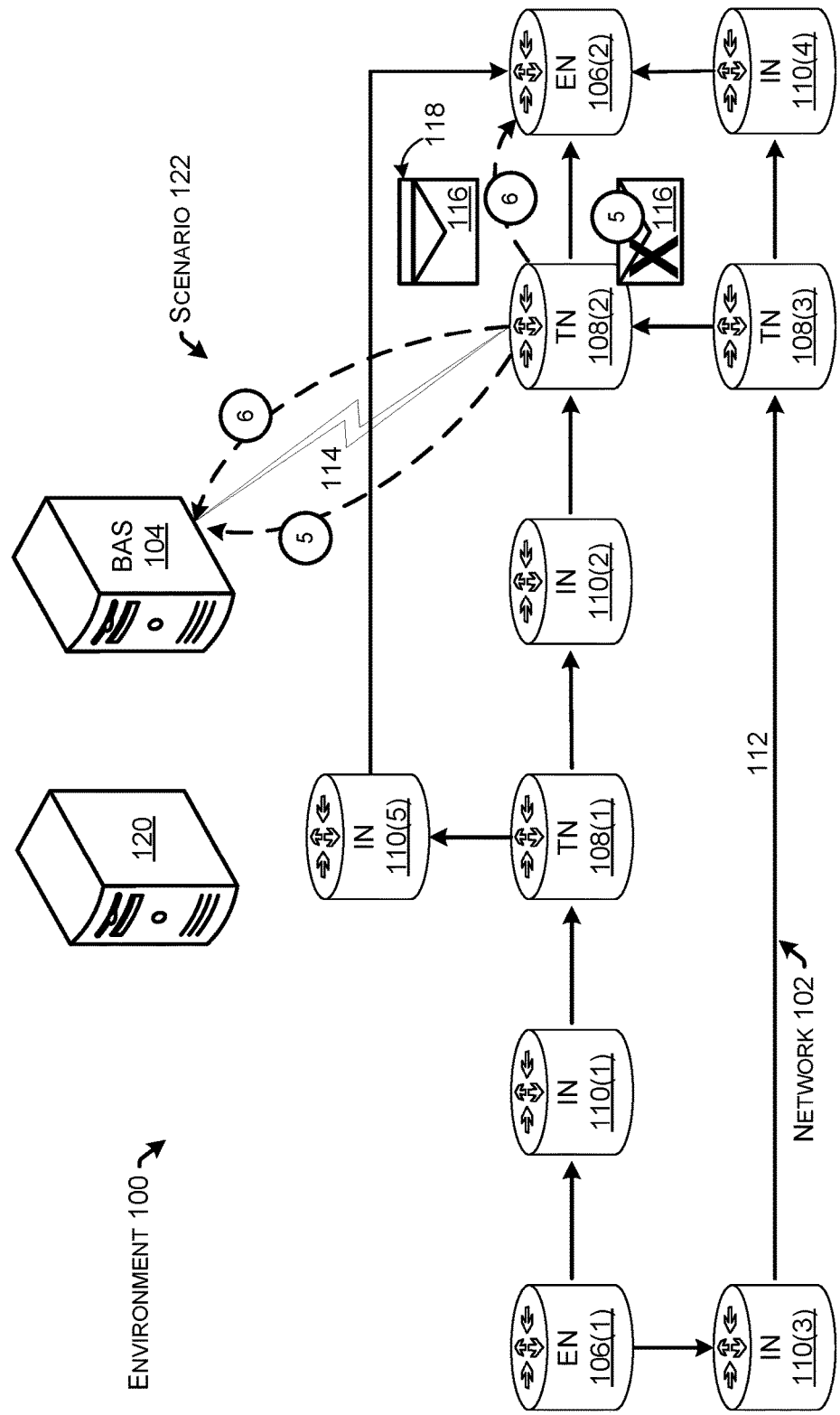
Figure 2A:
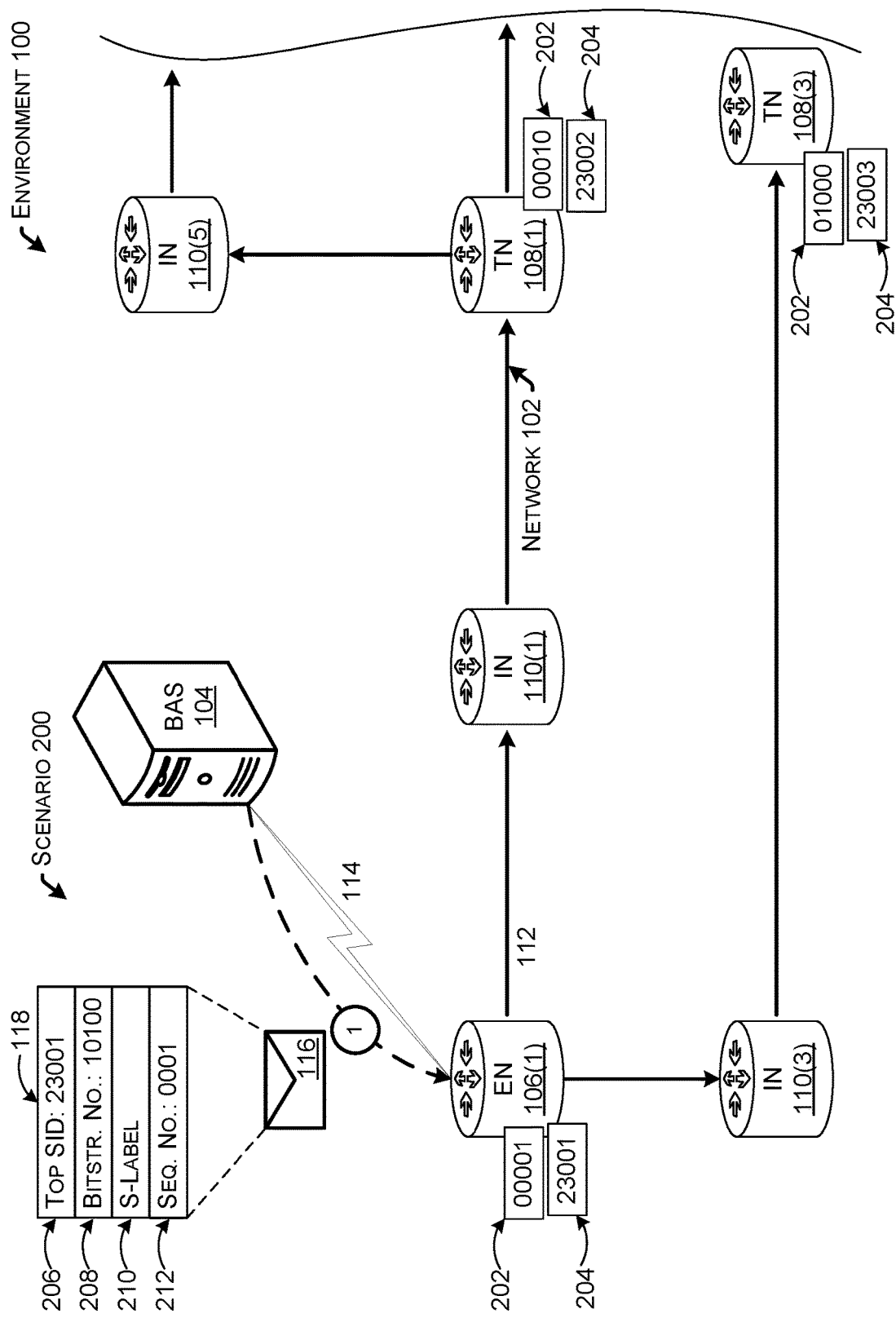
FIGS. 2A-2C illustrate partial component diagrams with example scenarios in which behavior assurance techniques may be performed as part of communications between network devices, in accordance with the present concepts.
Figure 2B:
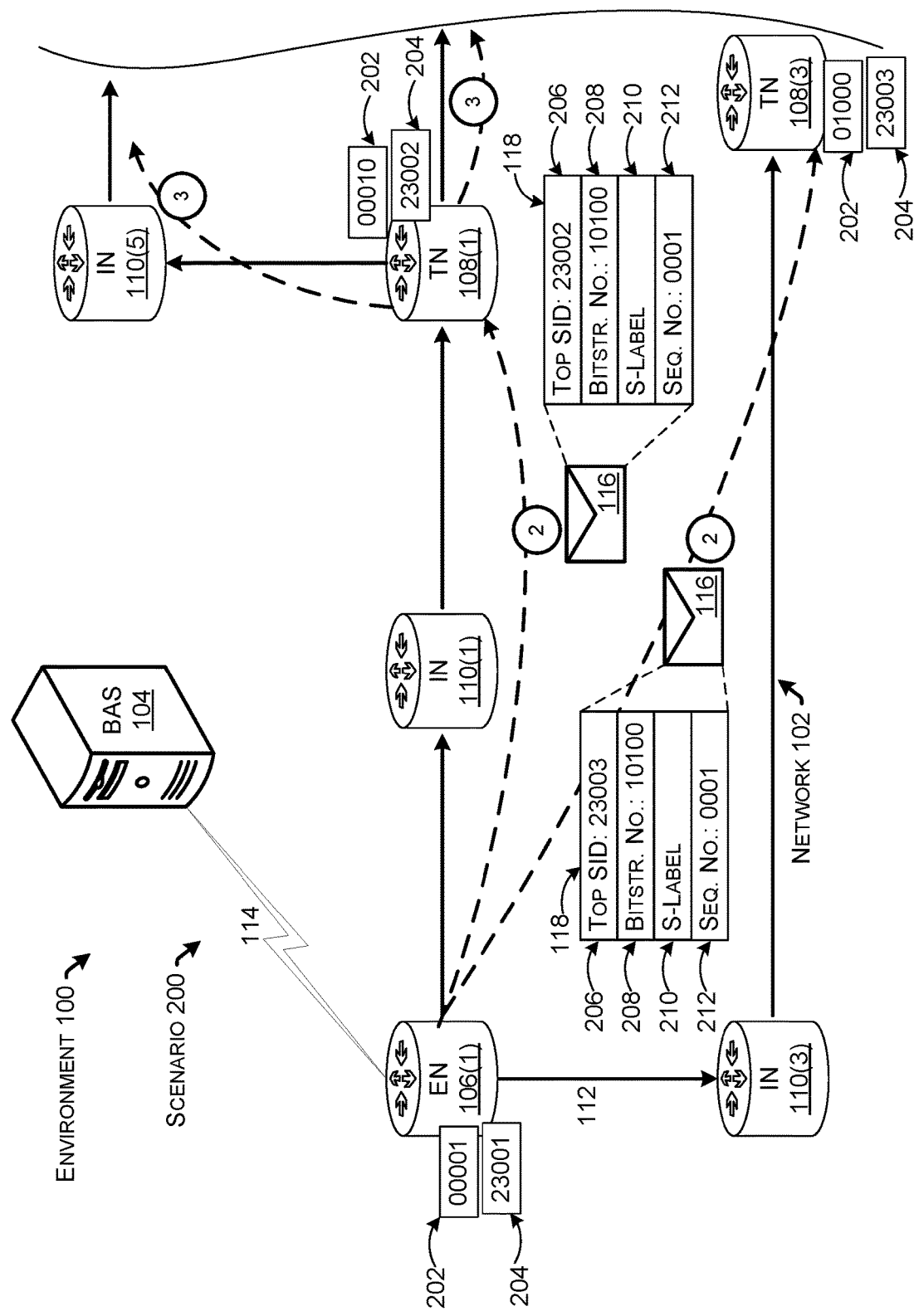
Figure 2C:
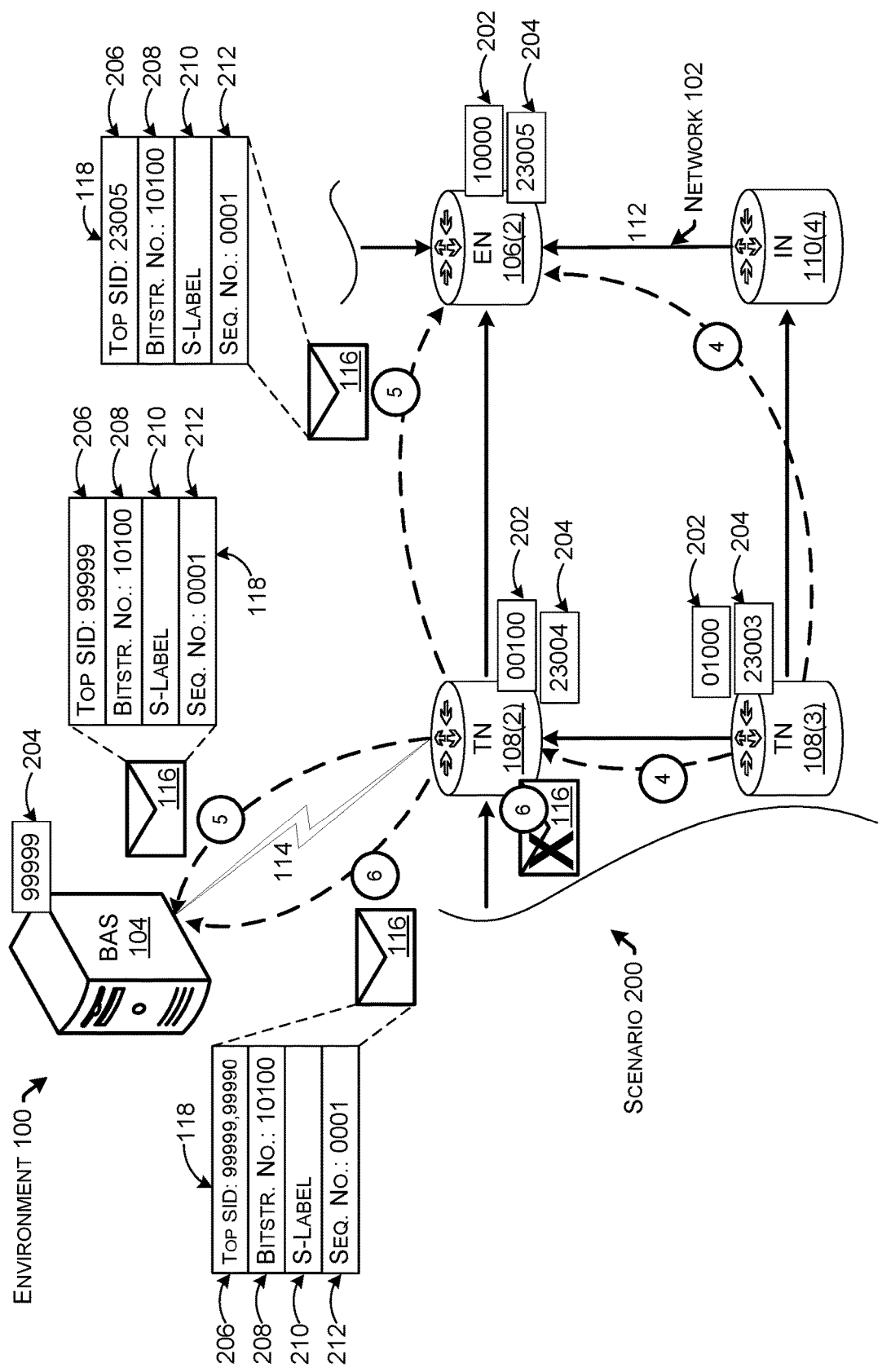

FIGS. 1A-2C collectively illustrate an example environment 100 in accordance with the present behavior assurance concepts. Example environment 100 may include a computing network 102 (e.g., network) and a behavior assurance server (BAS) 104. FIGS. 2A-2C show partial views of example computing network 102. FIGS. 1A-2C are not to scale. In some examples, computing network 102 may include one or more devices, such as end nodes (EN) 106, transit nodes (TN) 108, and/or intermediary nodes (IN) 110. Parentheticals are utilized after some reference numbers to distinguish like elements in FIGS. 1A-2C. Use of the reference number without the associated parenthetical is generic to the element. For instance, two end nodes 106 are shown in FIGS. 1A-1E, including end node 106(1) and end node 106(2). Also included in FIGS. 1A-2C are network connections 112, behavior assurance channel 114, probe packet 116, header 118, and controller 120, described below.

An explanation of general data traffic flow concepts within a DetNet architecture, such as example network 102, is provided below. Following the general DetNet data traffic flow description, an example scenario 122 describing behavior assurance concepts will be described relative to FIGS. 1A-1E. Finally, behavior assurance concepts focusing on additional details of probe packet 116 and header 118 will be described relative to an example scenario 200 shown in FIGS. 2A-2C.

Within example environment 100, the devices of computing network 102 (e.g., end nodes 106, transit nodes 108, intermediary nodes 110) need not necessarily have physical differences. For instance, a difference between an end node 106, transit node 108, and intermediary node 110 may relate to differences in actions performed and/or rolls played by the devices, rather than differences in device capabilities. Note that the behavior assurance server 104 may be considered part of the computing network 102 in some cases. Additionally or alternatively, in some cases one or more of the devices of the computing network 102 may serve as a behavior assurance server to perform behavior assurance techniques. The devices of computing network 102 may exchange communications (e.g., packets) via network connections 112, indicated by arrows. Only one network connection 112 (extending between intermediary node 110(3) and transit node 108(3) in FIG. 1A) is specifically designated in each FIG. to avoid clutter on the drawing page. In this case, the network connections 112 are shown with arrows indicating a directionality of data traffic flow for the example scenarios depicted in FIGS. 1A-2C. Note that the network connections 112 may allow two-way communications, whereas the direction indicated by the arrows is simply for illustration purposes relating to example scenarios described below. Furthermore, other network connections may be envisioned, but not relevant to the present concepts and therefore not illustrated. For instance, computing network 102 may have a mesh architecture connecting potentially all devices, such that a network connection may exist between intermediary node 110(1) and transit node 108(3), etc., but not discussed herein.

In some implementations, behavior assurance server 104 may communicate with devices of computing network 102 via a behavior assurance channel 114, which may utilize a network connection indicated by a lightning bolt. The behavior assurance channel 114 may be available for communication with DetNet devices of computing network 102. For purposes of illustration, end nodes 106 and transit nodes 108 may be considered DetNet devices, while the intermediary nodes 110 may be considered non-DetNet devices, or traditional network nodes. As such, in the scenarios described relative to FIGS. 1A-2C, behavior assurance server 104 may communicate with end nodes 106 and/or transit nodes 108 via behavior assurance channel 114. The designation of end nodes 106 and transit nodes 108 as DetNet devices and/or the designation of intermediary nodes 110 as non-DetNet devices is not meant to be limiting. Other node designations as DetNet or non-DetNet in computing network 102 and/or in other example computing networks are contemplated in accordance with behavior assurance concepts.

In example environment 100 illustrated in FIGS. 1A-2C, the network connections 112 and/or behavior assurance channel 114 may represent wireless connections. Network connections 112 and/or behavior assurance channel 114 may represent transport control protocol (TCP) network connections or any network connection (e.g., information-centric networking (ICN)) that enables the devices of computing network 102 to exchange packets. The network connections 112 represent, for example, data paths between the end nodes 106, transit nodes 108, and/or intermediary nodes 110. It should be appreciated that the term "network connection" may also be referred to as a "network path." The use of wireless connections in this example is not meant to be limiting. Other types of networks, network paths, and/or network connections are contemplated in accordance with behavior assurance concepts.

In some implementations, end node 106(1) may act as a starting point in a data traffic flow, and end node 106(2) may act as an ending point in the data traffic flow, as suggested by the directional arrows representing network connections 112. In some examples, network connections 112 may be viewed as tracks representing one or more timeslots (e.g., OAM timeslots) used for sending data traffic between end node 106(1) and end node 106(2). The roles played by the devices of computing network 102 in association with the data traffic flow may be related to the PREOF functions of DetNet architecture. A purpose of DetNet may include meeting very stringent service quality requirements by replicating data packets over different path segments for redundancy, thereby lowering a chance of a lost or delayed data packet. Thus, DetNet behaviors may include packet replication. DetNet behavior may follow by eliminating extra copies of the replicated data packets where path segments merge, to avoid duplication of data packets. Eliminating extra replications of data packets may help prevent undue resource consumption at a node.

In some cases, end node 106(1) may receive one or more data packets, or in other cases end node 106(1) may be an originator of one or more data packets. Some data packets traversing computing network 102 may be associated with DetNet data traffic, while some other data packets may not be related to DetNet data traffic per se. In some cases, as a DetNet device, end node 106(1) may be able to recognize a data packet as associated with DetNet data traffic. End node 106(1) may recognize a DetNet data packet due to a DetNet header, encapsulation, and/or other type of metadata associated with the data packet. Additionally or alternatively, end node 106(1) may be able to designate a data packet as associated with DetNet data traffic, and may add a DetNet header, encapsulation, metadata, etc. In some examples, a DetNet header may be a dataplane header, such as an internet protocol (IP) header or a multiprotocol label switching (MPLS) header, for instance. A data packet designated as DetNet data traffic, and/or encapsulated with a DetNet header, may be viewed as belonging to a DetNet domain for transmission across computing network 102, for instance.

In accordance with DetNet behaviors, end node 106(1) may replicate (e.g., copy) the one or more data packets (e.g., DetNet data packets). End node 106(1) may replicate underlying contents (e.g., payload) of the data packet as well as any encapsulation, header, etc. End node 106(1) may then forward the replicated data packets via network connections 112 to both intermediary node 110(1) and intermediary node 110(3). Specifically, intermediary node 110(1) and intermediary node 110(3) may each receive a copy of any given data packet from end node 106(1). In turn, intermediary nodes 110 may forward data packets, following the directionality of the network connections 112. Stated another way, the expected behavior of end node 106(1) upon receiving probe packet 116 is to replicate probe packet 116 and forward the replications to transit node 108(1) via intermediary node 110(1), and to transit node 108(3) via intermediary node 110(3).

Transit nodes 108 may have an option to perform a variety of PREOF functions, including receiving, ordering, replicating, eliminating, and/or forwarding DetNet data packets in network 102. For instance, transit node 108(1) may receive a DetNet data packet from intermediary node 110(1). Transit node 108(1) may replicate the data packet and forward the replicated data packet to end node 106(2) via intermediary node 110(5), and to transit node 108(2) via intermediary node 110(2). In an instance where multiple DetNet data packets are received at transit node 108(1), transit node 108(1) may order the data packets before replicating and/or forwarding. Transit node 108(1) may use sequence numbers of the data packets and/or other information to order the packets, for instance. Similarly, the expected behavior of transit node 108(3) is to replicate probe packet 116 received from intermediary node 110(3) and forward the replications to transit node 108(2), and to end node 106(2) via intermediary node 110(4).

Meanwhile, transit node 108(2) may receive data packets from intermediary node 110(2) and transit node 108(3). However, at least one of the data packets received from intermediary node 110(2) and transit node 108(3) by transit node 108(2) may be a replication of an original data packet that was replicated by end node 106(1). Therefore, to avoid sending duplicate data packets onward, transit node 108(2) may eliminate all but one of the replicated data packets. For example, after receiving a first copy of a replicated data packet, transit node 108(2) may eliminate any or all subsequently received data packets. In some examples, transit node 108(2) may recognize that an individual data packet is a replicate based on the DetNet header and/or other information (e.g., matching sequence number) associated with the data packet. Further, transit node 108(2) may forward the remaining (e.g., non-eliminated) data packet to end node 106(2). The forwarded data packet may (or may not) be the first replicated data packet received by transit node 108(2). Note that in a complex network, all transit nodes and/or DetNet nodes may not necessarily replicate data packets for forwarding along all available path segments; as long as some data traffic redundancy occurs, DetNet goals of assuring delivery of critical DetNet data packets may be accomplished.

In example network 102, end node 106(2) may receive one or more DetNet data packets from intermediary node 110(5), transit node 108(2), and/or intermediary node 110(4). End node 106(2) may handle the data traffic with various behaviors, including eliminating redundant data packets and/or ordering data packets. In some implementations, end node 106(2) may forward at least some data packets to other network devices and/or other computing networks. Furthermore, end node 106(2) may decapsulate any given data packet from a DetNet header, and/or may forward a data packet outside the DetNet domain. For example, end node 106(2) is expected to receive three replications of probe packet 116, decapsulate one copy for forwarding outside the DetNet domain, and eliminate the two subsequently received replications.

Example scenario 120 describing behavior assurance concepts will now be described relative to FIGS. 1A-1E. Behavior assurance concepts may include monitoring any of the above-mentioned DetNet behaviors with respect to the example environment 100. For example, behavior assurance server 104 may monitor whether end nodes 106, transit nodes 108, and/or intermediary nodes 110 are performing PREOF functions as expected. As noted above, the behavior assurance techniques described herein relative to example computing network 102 may be applied to computing networks that are not specifically DetNet, but in which devices and/or nodes perform similar operations (e.g., replication, elimination, ordering, overhearing, etc.). In example scenario 120, behavior assurance server 104 may monitor the expected PREOF functions using behavior assurance channel 114. Behavior assurance channel 114 may be a stateless, bidirectional, OAM channel utilizing network connections between behavior assurance server 104 and one or more of the DetNet devices of computing network 102, for instance. Behavior assurance channel 114 may also utilize the data plane.

FIGS. 1A-1E show several examples of communications between behavior assurance server 104 and various other devices of computing network 102. In some examples, the communications may utilize behavior assurance channel 114. The communications are indicated with dashed, numbered lines. For example, referring to FIG. 1A, at "Step 1," behavior assurance server 104 may send a probe packet 116 to end node 106(1) via the behavior assurance channel 114. In some examples, probe packet 116 may represent and/or mimic a typical data packet that may be included in data traffic associated with a service provided via computing network 102. For instance, probe packet 116 may be a "dummy" DetNet data packet sent into computing network 102. Also, probe packet 116 may be sent into computing network 102 in the data plane via behavior assurance channel 114. Behavior assurance server 104 may send probe packet 116 to end node 106(1) for the purpose of monitoring the PREOF functions of computing network 102, described above. Stated another way, behavior assurance server 104 may monitor the behavior of devices of computing network 102 regarding probe packet 116 to determine whether the devices are performing PREOF functions on probe packet 116 as expected.

In some implementations, novel behavior assurance semantics and/or other behavior assurance information may be used to communicate via the behavior assurance channel 114 to accomplish behavior assurance techniques. For example, behavior assurance server 104 may encapsulate the probe packet 116 with a header (e.g., DetNet header) 118 that includes the behavior assurance information. A DetNet device (e.g., end node 106(1), etc.) in computing network 102 may be programmed to apply behavior assurance semantics to the probe packet 116, forwarding the probe packet 116 to another DetNet device (e.g., transit node 108(1), etc.). The semantics and/or behavior assurance information may cause the DetNdet device to forward the probe packet 116 over an OAM timeslot, along a DetNet track, for instance. Further, the semantics and/or behavior assurance information in the header 118 may trigger a DetNet device (e.g., transit node 108(1), etc.) in computing network 102 to forward the probe packet 116 and/or an associated message back to the behavior assurance server 104. In some cases, behavior assurance server 104 may specify which DetNet devices and/or DetNet tracks the probe packet 116 traverses via the data plane in order to validate DetNet behaviors in particular locations in the computing network 102. Upon receiving the returned probe packet 116, behavior assurance server 104 may be able to review the behavior assurance information to determine whether one or more DetNet devices completed the expected data handling function(s). For instance, behavior assurance concepts may include differentiating between whether a DetNet device purposefully eliminated a data packet or inadvertently dropped a data packet. The probe packet 116 may be able to carry information back to behavior assurance server 104 that indicates such a distinction. Thus, behavior assurance information embedded in probe packet 116 may indicate to behavior assurance server 104 whether DetNet devices are behaving properly. Additional detail regarding the semantics and/or other behavior assurance information in header 118 will be described below relative to scenario 200 and FIGS. 2A-2C.

Continuing with example scenario 120 illustrated in FIGS. 1A-1E, probe packet 116 may continue to move through the computing network 102 according to the general DetNet data traffic patterns described above. Additionally, behavior assurance server 104 may monitor the behavior of devices of computing network 102 regarding probe packet 116, enabled by the behavior assurance information within header 118 of probe packet 116.

At "Step 2" in FIG. 1B, upon receiving probe packet 116 from behavior assurance server 104, end node 106(1) may recognize probe packet 116 as DetNet data traffic. For example, end node 106(1) may recognize probe packet 116 as DetNet data traffic by examining the contents of header 118. The probe packet 116 may have been received in a predefined OAM timeslot, for instance. End node 106(1) may proceed by replicating probe packet 116 and/or forwarding probe packet 116 toward transit node 108(1) and transit node 108(3). Also shown in FIG. 1B, in some implementations, end node 106(1) may send a message to behavior assurance server 104 via behavior assurance channel 114. The message may be the probe packet 116 (e.g., a replicate of probe packet 116), information from header 118, and/or another type of message. The sending of the message may be triggered by contents in header 118 and/or semantics programmed at end node 106(1), for instance. The message may be an indication and/or an acknowledgment of behavior assurance techniques. For instance, the message may indicate that end node 106(1) received probe packet 116, replicated probe packet 116, and/or forwarded probe packet 116. As such, behavior assurance server 104 may receive an indication that end node 106(1) behaved as expected regarding probe packet 116. Behavior assurance server 104 may be able to confirm the expected behavior(s) based on semantics contained in the message. As noted above, the semantics will be described in more detail relative to example scenario 200 and FIGS. 2A-2C, below.

At "Step 3" in FIG. 1C, transit node 108(1) may behave similarly to end node 106(1) in scenario 120. For example, upon receiving probe packet 116 from end node 106(1), transit node 108(1) may recognize probe packet 116 as DetNet data traffic. Also, transit node 108(1) may replicate probe packet 116 and/or forward probe packet 116 toward end node 106(2) and transit node 108(2). Also shown in FIG. 1C, end node 106(1) may send a message to behavior assurance server 104. For instance, the message may indicate that end node 106(1) received probe packet 116, replicated probe packet 116, and/or forwarded probe packet 116.

At "Step 4" in FIG. 1C, upon receiving probe packet 116 from end node 106(1), transit node 108(3) may recognize probe packet 116 as DetNet data traffic, replicate probe packet 116, and/or forward probe packet 116 toward transit node 108(2) and end node 106(2). Transit node 108(3) may also send a message to behavior assurance server 104 via behavior assurance channel 114.

At "Step 5" in FIG. 1D, transit node 108(2) may eliminate one replication of probe packet 116, represented by an "X" over probe packet 116. The replication of probe packet 116 may be eliminated since transit node 108(2) has received two replications. One probe packet 116 came from transit node 108(1) in Step 3, and another probe packet 116 came from transit node 108(3) in Step 4. Therefore, to avoid passing duplicate probe packets 116 forward, transit node 108(2) may eliminate one replication. Transit node 108(2) may also send a message to behavior assurance server 104 via behavior assurance channel 114, indicating that transit node 108(2) received one replication of a probe packet 116 and/or eliminated one replication of a probe packet 116.

At "Step 6" in FIG. 1D, transit node 108(2) may forward the remaining probe packet 116 (e.g., the probe packet that was not eliminated) toward end node 106(2). Transit node 108(2) may also send a message to behavior assurance server 104 indicating that the remaining probe packet 116 was received and/or forwarded, for example.

At "Step 7," "Step 8," and "Step 9" in FIG. 1E, end node 106(2) has received three replications of probe packet 116 in scenario 120. In Step 7 and Step 8, redundant copies of the probe packet 116 may be eliminated at end node 106(2). Also, messages regarding the elimination of the redundant copies may be provided to behavior assurance server 104 via behavior assurance channel 114. In Step 9, end node 106(2) may send a message to behavior assurance server 104 indicating receipt of the third replication of probe packet 116. In some examples, end node 106(2) may decapsulate probe packet 116. End node 106(2) may also forward probe packet 116 to another device or network.

At "Step 10" in FIG. 1E, behavior assurance server 104 may communicate with controller 120 and/or other device. For example, behavior assurance server 104 may receive the messages regarding behaviors of devices in the computing network 102, and may forward the messages to controller 120. In some examples, behavior assurance server 104 may compile information from the messages and forward a report or summary of the compiled information. In some cases, behavior assurance server 104 may make a determination regarding the received messages, such as whether a device of computing network 102 is behaving as expected, and communicate the result in Step 10. Behavior assurance server 104 may communicate regularly and/or irregularly with controller 120 and/or other device. For example, behavior assurance server 104 may send a communication to controller 120 in response to instances where a device of computing network 102 is not behaving as expected. Behavior assurance server 104 may communicate with controller 120 via a network connection, such as example network connections 112 described above.

In some implementations, the amount of monitoring may vary at different devices in a network. For instance, in another scenario, transit node 108(1) of computing network 102 may send messages regarding probe packets to behavior assurance server 104, while transit node 108(3) may not. Behavior assurance server 104 may designate which network devices will send messages. In another instance, behavior assurance server 104 may receive feedback regarding probe packet elimination, but not another behavior, such as probe packet receipt, probe packet forwarding, probe packet ordering, etc. Stated another way, behavior assurance server 104 may sample expected behavior across a network by sending probe packets to and/or receiving feedback from, and/or certain types of feedback from, a select portion of devices in a network.

FIGS. 2A-2C collectively illustrate example scenario 200 in accordance with the present behavior assurance concepts. Behavior assurance concepts focusing on additional details of probe packet 116 and/or header 118 will now be described relative to example scenario 200. Scenario 200 presents selected, representative examples of probe packet 116 and/or header 118, rather than an exhaustive explanation of all potential communications between devices of computing network 102. Additionally, some aspects of the examples shown in FIGS. 2A-2C may be similar to aspects of the examples described above relative to FIGS. 1A-1E. Therefore, for sake of brevity, not all elements of FIGS. 2A-2C will be described in detail. Also, due to limitations of the drawing pages, FIGS. 2A-2C show partial views of example computing network 102 so that additional details may be added to the FIGS. FIGS. 2A-2C are not to scale.

At "Step 1" of scenario 200 shown in FIG. 2A, behavior assurance server 104 may send a probe packet 116 to end node 106(1) via the behavior assurance channel 114. Probe packet 116 may include header 118. In general, a wide variety of behavior assurance information is envisioned for any given header 118 of a probe packet 116. In some examples, behavior assurance information may include identifying information, which may pertain to devices of computing network 102, segment paths in computing network 102, and/or timeslots for sending probe packets 116, for instance. Behavior assurance information may include messaging intended for the behavior assurance server 104. Examples of behavior assurance information are provided below.

In some examples, DetNet devices of computing network 102 may be assigned identifying information consistent with behavior assurance techniques. For example, in FIGS. 2A-2C, the DetNet devices are assigned a bitstring ID 202. As shown in FIG. 2A, the bitstring ID 202 of end node 106(1) is "00001," the bitstring ID 202 of transit node 108(1) is "00010," and the bitstring ID 202 of transit node 108(3) is "01000." Within computing network 102, the bitstring ID 202 may be a potentially unique ID (e.g., BitID). In FIGS. 2A-2C, the DetNet devices are also assigned a segment ID (SID) 204. The SID 204 may be a DetNet-OAM-SID, for instance. In some cases, the SIDs 204 assigned in behavior assurance techniques may have hypertext preprocessor (PHP) disabled. As shown in FIG. 2A, the SID 204 of end node 106(1) is "23001," the SID 204 of transit node 108(1) is "23002," and the SID 204 of transit node 108(3) is "23003." Also note, shown in FIG. 2C, the bitstring ID 202 of transit node 108(2) is "00100," the bitstring ID 202 of end node 106(2) is "10000," the SID 204 of transit node 108(2) is "23004," and the SID 204 of end node 106(2) is "23005."

In some implementations, at least some of the behavior assurance information included in header 118 of probe packet 116 may correspond to the bitstring IDs 202 and/or the SIDs 204 associated with the DetNet devices. For instance, as shown in FIG. 2A, header 118 includes a top SID 206 and a bitstring number 208. In example scenario 200, the top SID 206 may refer to the next destination node for probe packet 116 and/or a path (e.g., route) that the probe packet is expected to follow through the computing network 102. In this case, the top SID 206 has a value of "23001," indicating that end node 106(1) is expected to receive probe packet 116. The bitstring number 208 may refer to the destination DetNet device in computing network 102 at which a message may be relayed to behavior assurance server 104 upon receipt of probe packet 116. In this case, the bitstring number 208 has a value of "10100." In this example, the digit placement of a "1" in the bitstring number 208 corresponds to the digit placement in any bitstring ID 202 for an individual DetNet device. For instance, in this case, the bitstring number 208 "10100" specifies that transit node 108(2) and end node 106(2) will return messages to behavior assurance server 104 upon receipt of probe packet 116, since there is a "1" in the first and the third places in the string. Therefore, the encoding in the bitstring number 208 may be viewed as an example of a trigger for a node to send a message to behavior assurance server 104.

Also shown in the example header 118 in FIG. 2A is S-Label 210. S-Label 210 may refer to a timeslot in which probe packet 116 is to be sent through computing network 102. For instance, S-Label 210 may specify an OAM timeslot in which probe packet 116 will be sent via behavior assurance channel 114 (for sake of brevity, no particular value is specified for S-Labels 210 in the headers 118 in FIGS. 2A-2C). In some examples, a portion of available timeslots may be available, predefined, and/or reserved for probe packets 116. For example, one out of 100 potential timeslots may be allotted to probe packets 116. The allotment of timeslots may relate to ensuring an amount of bandwidth for probe packet 116 traffic.

Another aspect of behavior assurance information included in example header 118 in FIG. 2A is sequence number 212. In this case, sequence number 212 has a value of "0001." Sequence number 212 may refer to an ordered position the probe packet 118 occupies in a string of packets. Therefore, in this case, probe packet 116 may be viewed as the first packet in a string of packets. The sequence number may be used to order packets, and may be used to identify replicated packets, explained in further detail below.

In general, a wide variety of information is envisioned for inclusion in any given header of any given probe packet 116. The contents of example header 118 are intended for illustration purposes and are not meant to be limiting. In other examples, similar behavior assurance information may be included in headers for probe packets in computing networks that are not designed are operating with DetNet principles. To summarize, behavior assurance information may include any of various identifying information regarding devices and/or segment paths, information regarding handling of the probe packet, information intended for a behavior assurance server regarding monitoring, and/or information regarding a particular probe packet and/or contents thereof.

Upon receiving a probe packet 116 in scenario 200, DetNet devices of computing network 102 may apply a behavior assurance semantic (e.g., instructions). Behavior assurance semantics may include any of a variety of instructions and/or commands for handling a probe packet 116. In some implementations, the receipt and handling of probe packet 116 by end node 106(1) via behavior assurance channel 114 may be termed "channel ingress behavior." For example, upon receiving probe packet 116 from behavior assurance server 204, a behavior assurance semantic may instruct end node 106(1) to recognize that probe packet 116 is an OAM data packet. A semantic may include instructions to recognize an SID "2300x" as relevant to a DetNet device, where the "x" is an variable corresponding to an individual DetNet device, for instance. In this case, the Top SID 206 in header 118 has a value of "23001," therefore the probe packet may be recognized by end node 106(1) as an OAM data packet. Additionally or alternatively, end node 106(1) may recognize that probe packet 116 is an OAM data packet since it was received over an OAM timeslot (e.g., a predefined timeslot). In some examples, end node 106(1) may be further programmed to handle a probe packet 116 and/or OAM data packet by applying a semantic regarding packet handling instructions. Viewed another way, an SID 204 may be associated with a particular semantic for handling a probe packet 116. In the example scenario 200, the instructions applied by end node 106(1) to probe packet 116 may include: "If top SID=23001; POP and continue; forward over OAM timeslot." In this case, since the SID for end node 106(1) is 23001, and matches the top SID 206 shown in header 118, end node 106(1) will "POP" off the top SID 206 from the list and "forward over OAM timeslot." For instance, a next SID 204 in a list may be used for forwarding and/or specifying a route. The particular semantics and/or instructions described herein are presented for illustration purposes, and are not meant to be limiting. A wide variety of forms of semantics, instructions, and behavior assurance information is contemplated.

At "Step 2" of scenario 200 shown in FIG. 2B, end node 106(1) may replicate probe packet 116 and forward the replications to transit node 108(1) and transit node 108(3). As described above, end node 106(1) may be following a semantic to POP off a top SID 206 and forward probe packet 116. Bitstring number 208 "10100" specifies a path that runs through transit node 108(2). End node 106(1) may determine that two potential routes lead to transit node 108(2), and replicate probe packet 116 to forward over both routes. In other cases, end node 106(1) may be preprogrammed to replicate a probe packet 116 over the two potential routes, for instance, end node 106(1) may be designated as a "packet replicator." In still other cases, behavior assurance information in header 118 may instruct end node 106(1) to replicate a probe packet and forward over both routes. End node 106(1) may also generate a header 118 for the replications. In Step 2 of scenario 200, the top SIDs 206 for the replications specify the DetNet node to which the replication is being forwarded, the predetermined bitstring number 208, an S-Label 210 identifying a timeslot, and the sequence number 212. Therefore, the top SIDs 206 for the replications are "23002" and "23003," respectively, corresponding to transit node 108(1) and transit node 108(3). The bitstring number 208 remains the same. Also, the sequence number 212 remains the same, since the probe packets 116 are replicates.

At "Step 3" of scenario 200 shown in FIG. 2B, transit node 108(1) may replicate probe packet 116 received from end node 106(1), and forward along to transit node 108(2) and end node 106(2), similar to data traffic patterns described relative to FIGS. 1A-1E. Transit node 108(1) may be designated as a "packet replicator," for instance. In some examples, the handling of the contents of header 118 and/or the semantics followed by transit node 108(1) may be similar to Step 1 in scenario 200, and will not be described again for sake of brevity.

At "Step 4" of scenario 200 shown in FIG. 2C, transit node 108(3) may replicate probe packet 116 received from end node 106(1), and forward along to transit node 108(2) and end node 106(2), similar to data traffic patterns described relative to FIGS. 1A-1E. Transit node 108(3) may be designated as a "packet replicator," for instance. Once again, the handling of the contents of header 118 and/or the semantics followed by transit node 108(3) may be similar to Step 1 in scenario 200, and will not be described again for sake of brevity.

At "Step 5" of scenario 200 shown in FIG. 2C, transit node 108(2) has received a replicate of probe packet 116 from transit node 108(1) (Step 3) and from transit node 108(3) (Step 4). The probe packet 116 may be received in either order. Transit node 108(2) may recognize each of the replicates as OAM data packets. Upon receipt of the first replicate, transit node 108(2) may follow the semantic "if top SID=23004; POP and continue; forward over OAM timeslot." In this case, transit node 108(2) may POP off the top SID 206, and forward the packet to end node 106(2) with a new top SID 206 in header 118, "23005."

Also at Step 5 in scenario 200, another behavior assurance semantic may trigger transit node 108(2) to send a message to behavior assurance server 104. The message may be sent via behavior assurance channel 114. In some implementations, the receipt of probe packet 116 and sending a message back to behavior assurance server 104 via behavior assurance channel 114 may be termed "channel egress behavior." Note that together, the channel ingress and channel egress behaviors may be viewed as a virtual, bidirectional OAM channel (e.g., behavior assurance channel 114) between the behavior assurance server 104 (e.g., centralized OAM server) and the DetNet nodes of computing network 102. Also note that the channel ingress and channel egress behaviors are performed in the dataplane in these examples. Referring again to scenario 200, an example semantic corresponding to Step 5 may be: "If header={[0001][00100]};

If action="eliminate," encapsulate 99999;99990, forward; Else encapsulate 99999, forward." In this semantic, first the instructions ask if header 118 of probe packet 116 includes a sequence number 212 of "0001," and if the header 118 includes the bitstring ID 202 of "00100" corresponding to transit node 108(2). If the "0001" and "00100" are present in header 118, then the semantic asks if the local action by transit node 108(2) is to eliminate. If the local action is to eliminate, the instructions are to encapsulate probe packet 116 with "99999;99990" and forward to behavior assurance server 104. If the local action is not to eliminate, the instructions are to encapsulate probe packet 116 with "99999" and forward to behavior assurance server 104. In the case of Step 5, since this is the first replicate of probe packet 116 received by transit node 108(2) the action is not to eliminate.

Accordingly, since the header 118 information matches the locally expected information (in this case "{[0001] [00100]}"), and the action is not to eliminate, transit node 108(2) may generate a new header 118 for probe packet 116 and send probe packet 116 to behavior assurance server 104 via behavior assurance channel 114. The new header will include "99999" as the top SID 206. (In this case, both "99999" and "99990" may be advertised as SIDs 204 for behavior assurance server 104, and both may have PHP disabled.) Also, "99999" may be viewed as the message to behavior assurance server 104. Note that many variations in format and content of semantics are contemplated. For instance, the semantic may investigate additional aspects and/or locally expected information of a header and/or probe packet contents, such as a version number, channel type, etc. In some variations, a header of a received probe packet may include DetNet ACH information, and a DetNet node may populate a forwarding table with a BitID of the DetNet node and matching bits from the DetNet ACH of the received probe packet, for instance.

In some examples, behavior assurance server 104 may also follow behavior assurance semantics upon receipt of probe packets 116 and/or other types of messages. An example semantic followed by behavior assurance server 104 may be: "If incoming label={99999,99990}, probe action=eliminated; Else if incoming label={99999}, probe action=forwarded; Else Drop." Therefore, upon receipt of a probe packet 116 encapsulated with "99999" from transit node 108(2), behavior assurance server 104 may determine that transit node 108(2) forwarded probe packet 116 as expected.

At "Step 6" of scenario 200 shown in FIG. 2C, upon receipt of the second replicate, transit node 108(2) may recognize that the replicate is a copy of a probe packet 116 it has already received. For instance, transit node 108(2) may determine that a sequence number 212 matches an already received sequence number 212 from another earlier-arriving probe packet 116. The sequence number 212 may already be known in a forwarding table, etc. Additionally or alternatively, probe packet 116 may be recognized as a replicate by having a matching S-Label to a previously received packet from a different upstream sender, for instance. Upon determining that a probe packet 116 is a replicate, transit node 108(2) may follow a semantic which instructs transit node 108(2) to eliminate the second replicate. The eliminated second replicate probe packet 116 is shown with an "X." Also at Step 6, another behavior assurance semantic may trigger transit node 108(2) to send a message to behavior assurance server 104 via behavior assurance channel 114, for instance. As such, Step 6 may represent another example of "channel egress behavior."

The message to behavior assurance server 104 may be triggered by the semantic described relative to Step 5 of scenario 200. In this case, the portion of the semantic instructing "If action="eliminate," encapsulate 99999; 99990, forward," applies. Accordingly, transit node 108(2) may generate a new header 118 for probe packet 116 and send probe packet 116 to behavior assurance server 104 via behavior assurance channel 114. The new header will include "99999;99990" as the top SID 206. Upon receipt of probe packet 116 in Step 6, behavior assurance server 104 may apply the semantic described above for Step 5, a portion of which instructs: "If incoming label={99999,99990}, probe action=eliminated." Therefore, in this case, "99999; 99990" acts as an SID 204 for behavior assurance server 104 and also acts as the message to behavior assurance server 104 that at least one replicate of probe packet 116 was eliminated by transit node 108(2).

Through Steps 5 and 6 of scenario 200, behavior assurance server 104 received two replicates of probe packet 116. The replicate in Step 5 relayed a message to behavior assurance server 104 that a probe packet 116 was forwarded from transit node 108(2); the replicate in Step 6 relayed a message to behavior assurance server 104 that a probe packet 116 was eliminated by transit node 108(2). Therefore, behavior assurance server 104 may determine that transit node 108(2) is behaving as expected. From receipt of these replicates and/or the behavior assurance information contained in the respective headers 118 of the replicates, behavior assurance server 104 may also confirm that end node 106(1) replicated probe packet 116 as expected. In an instance where behavior assurance server 104 does not receive replicates as expected (not shown), behavior assurance server 104 may conclude that a node responsible for replicating probe packet 116 is not behaving as expected. Furthermore, the bitstring number 208 of probe packet 116 designates the bitstring ID 202 of end node 106(2), "10000." Thus, behavior assurance server 104 may receive further messages in a continuation of scenario 200 as end node 106(2) follows behavior assurance semantics upon receiving replicates from transit node 108(1) in Step 3, transit node 108(3) in Step 4, and transit node 106(2) in Step 5. Therefore, behavior assurance server 104 may be able to validate further expected behaviors in computing network 102, such as expected replication and forwarding behaviors that would supply the replicates to end node 106(2), and expected eliminations of all but one replicate received at end node 106(2).

Additional scenarios are envisioned in accordance with behavior assurance techniques. As noted above, scenario 200 presents selected, representative examples of probe packet 116 and/or header 118, rather than an exhaustive explanation of all potential communications between devices of computing network 102. In some implementations, behavior assurance server 104 may be able to monitor additional behaviors of devices, and/or monitor specific behaviors of devices, using variations of the above-described semantics and/or behavior assurance information. For example, a behavior assurance server 104 may be able to monitor whether a node is ordering data packets as expected. In this example, behavior assurance server 104 may send multiple probe packets 116 into a computing network (not shown). Headers of the multiple probe packets may include consecutive sequence numbers (e.g., 0001, 0002, 0003, etc.). However, behavior assurance server 104 may purposefully send the probe packets out of sequential order. In an instance where behavior assurance server 104 receives messages from another node in the computing network with the sequence numbers properly ordered, the behavior assurance server 104 may determine that a node responsible for ordering data packets is behaving as expected. Likewise, in an instance where behavior assurance server 104 receives messages from another node in the computing network with the sequence numbers improperly ordered, the behavior assurance server 104 may determine that a node responsible for ordering data packets is not behaving as expected. In another example, behavior assurance server 104 may be able to specifically monitor whether a node is eliminating data packets as expected by purposefully sending two replicates of a probe packet into a computing network, and monitoring to see whether the node eliminated one of the two replicates as expected.

To summarize, the behavior assurance techniques described herein may be used determine whether devices in a computing network are behaving as expected. The techniques may help identify operational issues before lost packets or increasing latencies become problematic. The techniques may be relatively lightweight, featuring low computational cost and/or low bandwidth usage. In particular, behavior assurance techniques may help validate expected behaviors in DetNet architectures by working seamlessly within, and therefore not interrupting, ongoing operations. Furthermore, the benefits of behavior assurance techniques may become increasingly useful as computing networks grow in complexity.

Figure 3:
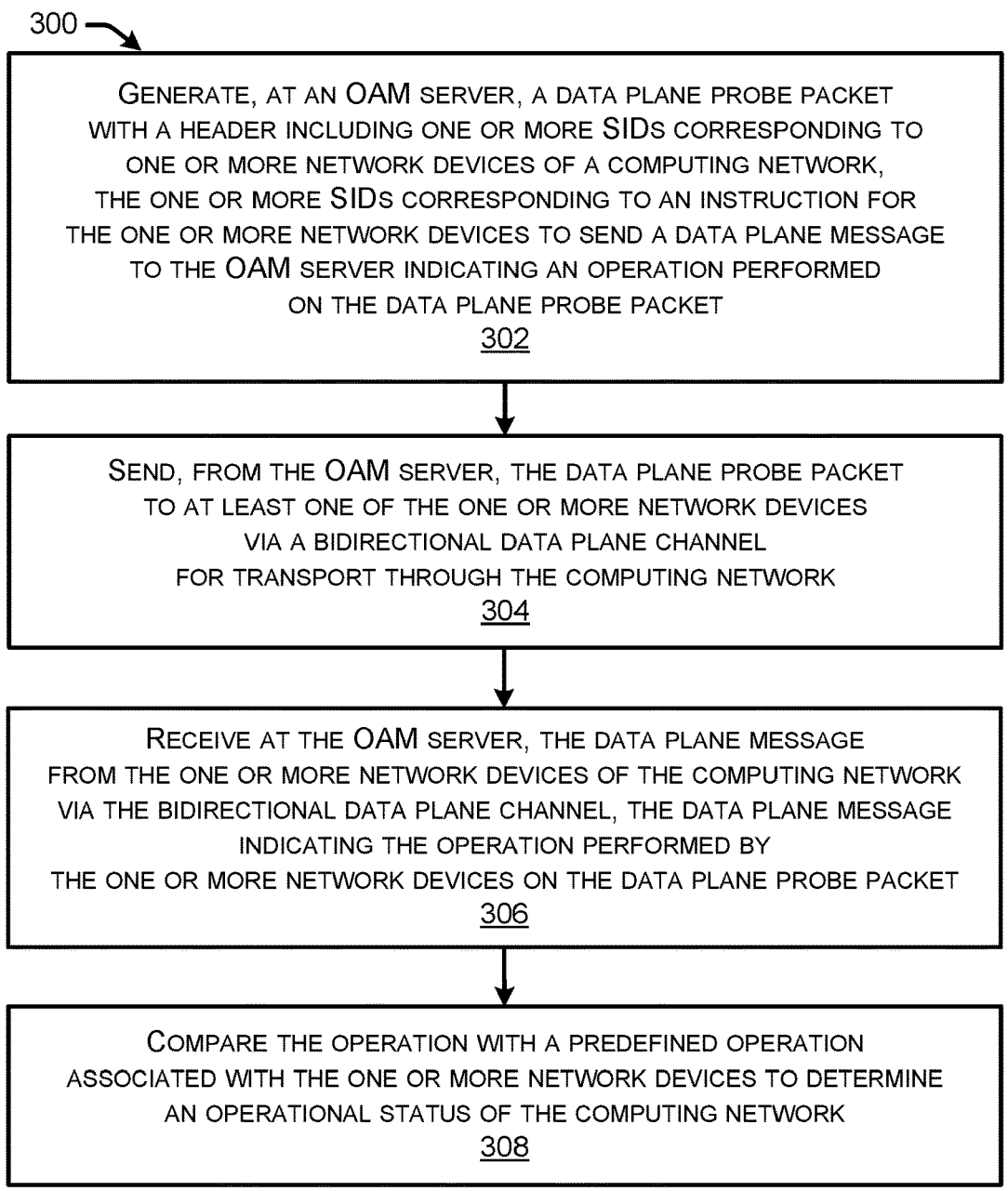
FIGS. 3 and 4 illustrate flow diagrams of example behavior assurance methods for assuring performance among network devices, in accordance with the present concepts.
Figure 4:
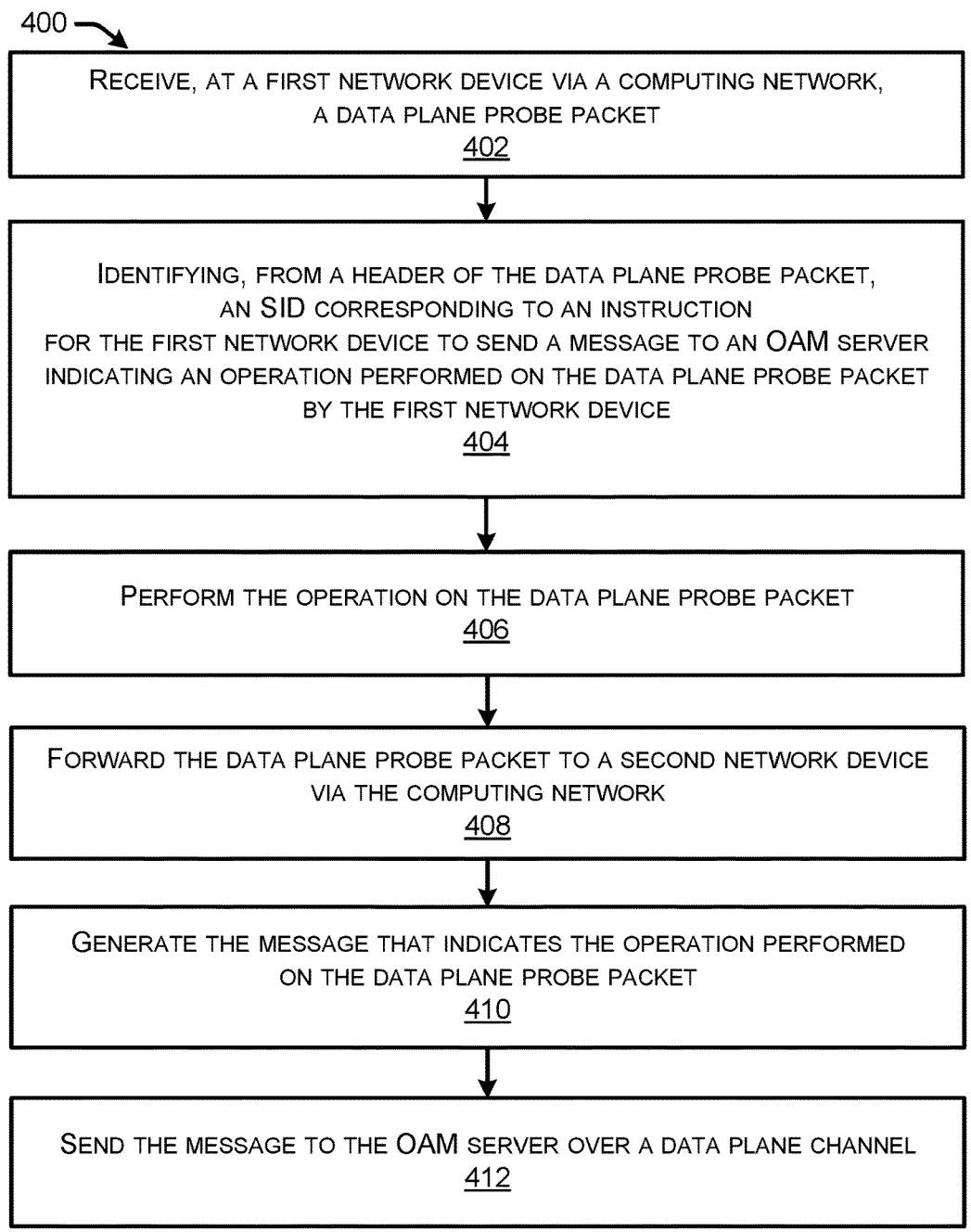

FIGS. 3 and 4 illustrate flow diagrams of example methods 300 and 400 that include functions that may be performed at least partly by network devices and/or server devices, such as the DetNet devices and/or behavior assurance server 104 described relative to FIGS. 1A-2C. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for a device to perform behavior assurance techniques. Method 300 may be performed by an operations, administration, and management (OAM) server (e.g., behavior assurance server 104) communicatively coupled to one or more network devices (e.g., end node 106, transit node 108), for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include generating, at an OAM server, a data plane probe packet with a header including one or more segment identifiers (SIDs). The header of the probe packet may specify an OAM timeslot for sending the probe packet to the one or more network devices. The SIDs may correspond to one or more network devices of the computing network. In some examples, the one or more SIDs may also correspond to an instruction for the one or more network devices to send a data plane message to the OAM server. The data plane message may indicate an operation performed on the data plane probe packet, for instance. For example, the operation may pertain to replicating the data plane probe packet, ordering the data plane probe packet with respect to other data plane probe packets, and/or eliminating at least one replication of the data plane probe packet.

At 304, method 300 may include sending, from the OAM server, the data plane probe packet to at least one of the one or more network devices. For example, the data plane probe packet may be sent via a bidirectional data plane channel for transport through the computing network.

At 306, method 300 may include receiving, at the OAM server, the data plane message from the one or more network devices of the computing network. The data plane message may be received via the bidirectional data plane channel. In some examples, the OAM server may send the data plane probe packet to and receive the message from the same network device. In other examples, the OAM server may send the data plane probe packet to a first network device, and receive the data plane message from a second network device that is different than the first network device. For instance, the header of the probe packet may include an SID corresponding to the second network device. In some implementations, the data plane message may indicate the operation performed on the data plane probe packet. For example, the data plane message may indicate the operation performed on the data plane probe packet via an SID corresponding to the OAM server.

At 308, method 300 may include comparing the operation with a predefined operation associated with the one or more network devices. In some examples, a result of the comparison may be used to determine an operational status of the computing network. In some examples, comparing the operation with the predefined operation may result in determining that the operation matches the predefined operation. In this instance, the operational status of the computing network may be determined to be satisfactory. Otherwise, where the operation does not match the predefined operation, the operational status of the computing network may be determined to be unsatisfactory. Stated another way, the behavior of the corresponding network device may not be as expected. In this instance, the OAM server may alert a controller that the network device is not performing an operation as expected, and/or that the computing network is not operating satisfactorily.

FIG. 4 illustrates a flow diagram of an example method 400 for network devices to perform behavior assurance techniques. Method 400 may be performed by a network device (e.g., end node 106, transit node 108) communicatively coupled to an OAM server (e.g., behavior assurance server 104), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving, at a first network device via a computing network, a data plane probe packet. In some examples, the method may also include determining whether the data plane probe packet is received via an OAM timeslot.

At 404, method 400 may include identifying, from a header of the data plane probe packet, a segment identifier (SID) corresponding to an instruction for the first network device to send a message to the OAM server indicating an operation performed on the data plane probe packet by the first network device. In some examples, the instruction to generate the message may depend at least in part on determining that the data plane probe packet was received via an OAM timeslot.

At 406, method 400 may include performing the operation on the data plane probe packet. In some cases, the operation may include replicating the data plane probe packet, ordering the data plane probe packet with respect to other data plane probe packets, and/or eliminating at least one replication of the data plane probe packet. In other cases, the operation may have been performed by a different network device before the data plane probe packet arrived at the first network device. For instance, in an instance where the operation is replication, an upstream node may have replicated the data plane probe packet, and the first network device may have received at least two replications of the data plane probe packet.

At 408, method 400 may include forwarding the data plane probe packet to a second network device via the computing network.

At 410, method 400 may include generating the message that indicates the operation performed on the data plane probe packet. The message may comprise a replication of the data plane probe packet. The message may have a new header that includes an indication of the operation performed, for instance. In some examples, the indication that the operation was performed may be encoded in the new header as an SID. The SID encoded with the indication may also correspond to the OAM server. Stated another way, a header of the message sent to the OAM server may contain an SID that is assigned to the OAM server and is also encoded with the indication that the operation was performed.

At 412, method 400 may include sending the message to the OAM server over a data plane channel.

Figure 5:
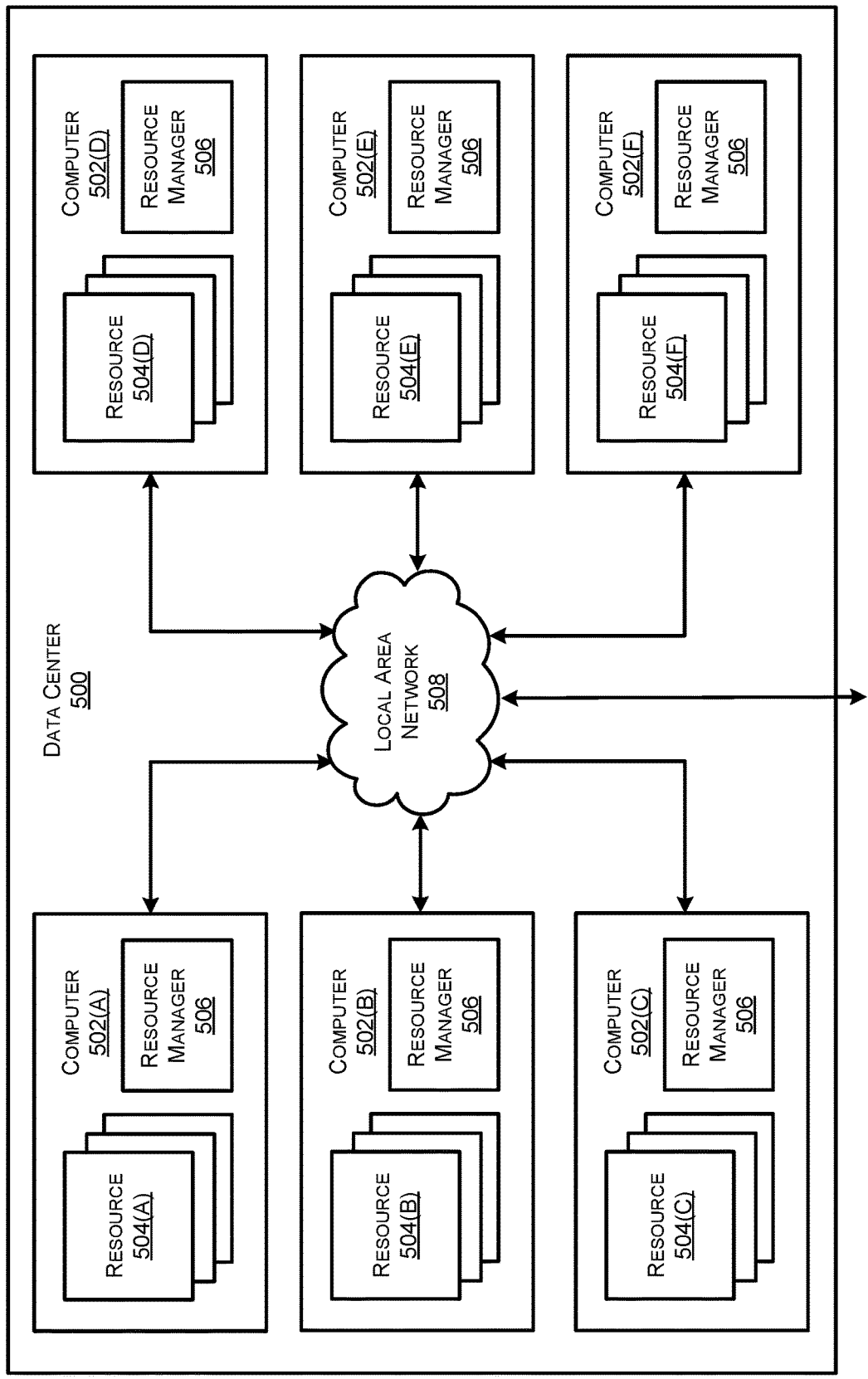
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, any type of networked device described herein, such as end nodes 106, transit nodes 108, DetNet devices, and/or behavior assurance server 104. Although, computers 502 may comprise any type of networked device, such as servers, switches, routers, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as server devices, user devices, and/or routers in the computing network 102.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
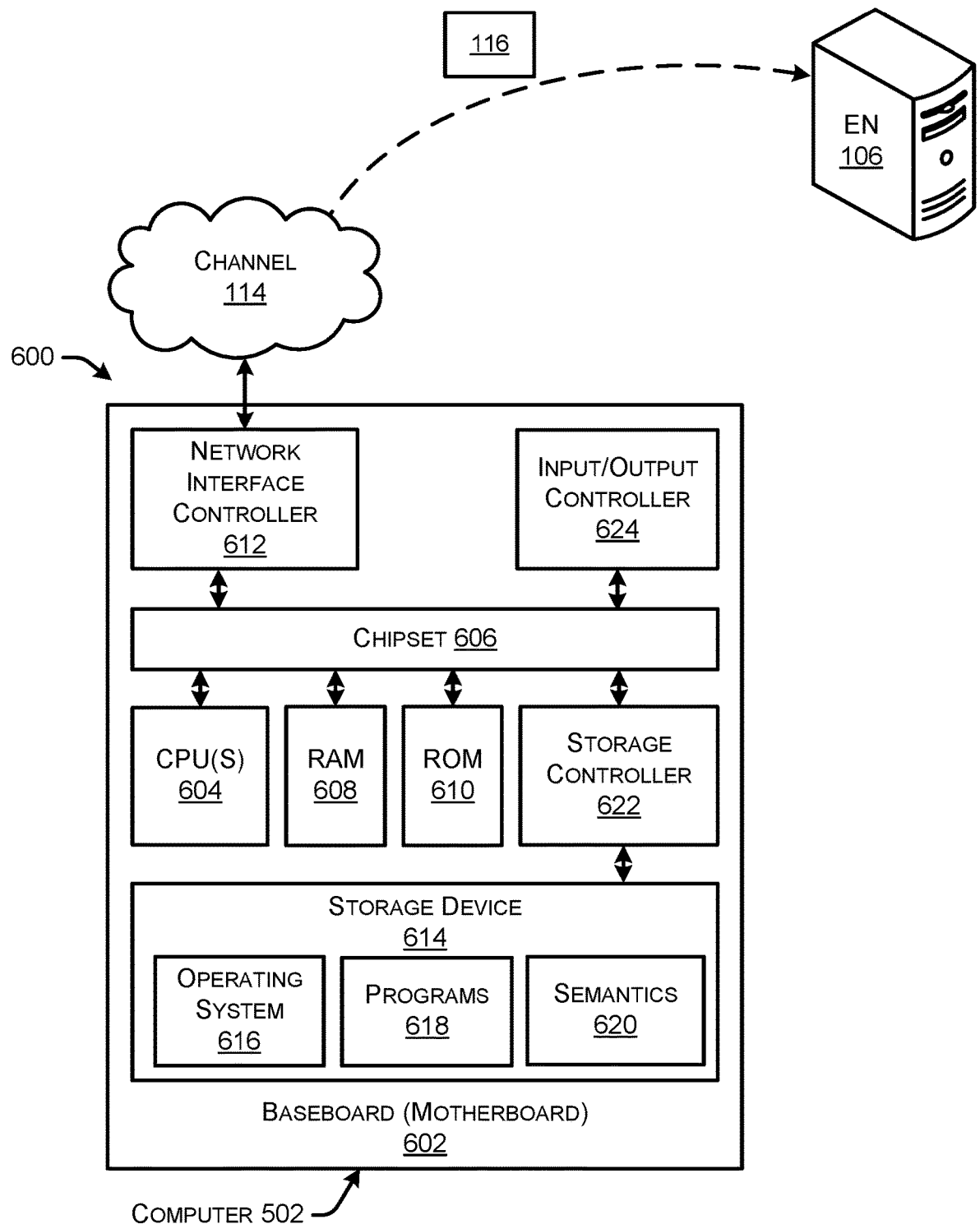
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., end nodes 106, transit nodes 108, DetNet devices, etc.), and may comprise networked devices such as servers, switches, routers, hubs, bridges, gateways, modems, repeaters, access points, etc. For instance, computer 502 may correspond to behavior assurance server 104.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the networks 102 and/or 508, and/or behavior assurance channel 114. The chipset 606 can include functionality for providing network connectivity through a network interface controller (NIC) 612, such as a gigabit Ethernet adapter. The NIC 612 is capable of connecting the computer 502 to other computing devices over the network 102 and/or behavior assurance channel 114. For instance, in the example shown in FIG. 6, NIC 612 may help facilitate transfer of packets, data, messages, and/or communications, such as probe packets 116, over the behavior assurance channel 114 with DetNet devices (e.g., end node 106), and/or with controller 120, etc. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618, behavior assurance semantics 620, and/or other data. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 502. In some examples, the operations performed by the computing network 102, and or any components included therein, may be supported by one or more devices similar to computer 502. Stated otherwise, some or all of the operations performed by the computing network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regard to FIGS. 1A-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as end nodes 106, transit nodes 108, DetNet devices, and/or behavior assurance server 104, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by as end nodes 106, transit nodes 108, DetNet devices, behavior assurance server 104, and/or other devices. In some examples, the communications may include data, packets, probe packets, messages, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with behavior assurance techniques. For instance, the programs 618 may cause the computer 502 to perform techniques for communicating with other devices using any type of semantic, protocol, and/or standard usable for determining connectivity. Additionally, the programs 618 may comprise instructions that cause the computer 502 to perform the specific techniques for the employment of behavior assurance monitoring, validating, and/or other operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
   generating, at an operations, administration, and management (OAM) server, a data plane probe packet with a header including one or more segment identifiers (SIDs) corresponding to one or more network devices of a computing network, the one or more SIDs corresponding to an instruction for the one or more network devices to send a data plane message to the OAM server indicating an operation performed on the data plane probe packet;
   sending, from the OAM server, the data plane probe packet to at least one of the one or more network devices via a bidirectional data plane channel for transport through the computing network;
   receiving, at the OAM server, the data plane message from the one or more network devices of the computing network via the bidirectional data plane channel, the data plane message indicating the operation performed by the one or more network devices on the data plane probe packet; and
   comparing, by the OAM server, the operation indicated in the data plane message with a predefined operation associated with the one or more network devices to determine an operational status of the computing network.

2. The computer-implemented method of claim 1, wherein the operation includes at least one of:
   replicating the data plane probe packet;
   ordering the data plane probe packet with respect to other data plane probe packets; and
   eliminating at least one replication of the data plane probe packet.

3. The computer-implemented method of claim 1, wherein the OAM server sends the data plane probe packet to and receives the data plane message from the same network device of the one or more network devices.

4. The computer-implemented method of claim 1, wherein the OAM server sends the data plane probe packet to a first network device of the one or more network devices and receives the data plane message from a different, second network device of the one or more network devices.

5. The computer-implemented method of claim 4, wherein the header of the probe packet includes an SID corresponding to the second network device.

6. The computer-implemented method of claim 1, wherein the data plane message indicates the operation performed on the data plane probe packet via an SID corresponding to the OAM server.

7. The computer-implemented method of claim 1, wherein the header of the probe packet specifies an OAM timeslot for sending the probe packet to the at least one of the one or more network devices.

8. The computer-implemented method of claim 1, wherein the comparing the operation results in determining that the operation matches the predefined operation and the operational status of the computing network is determined to be satisfactory.

9. An operations, administration, and management (OAM) server comprising:
one or more processors configured to communicate via a bidirectional data plane channel with one or more network devices of a computing network; and
one or more non-transitory computer-readable media storing computer-executable instructions that, when executed by the one or more processors, cause the one or more processors to:
generate a data plane probe packet with a header including one or more segment identifiers (SIDs) corresponding to the one or more network devices of the computing network, the one or more SIDs corresponding to an instruction for the one or more network devices to send a data plane message to the OAM server indicating an operation performed on the data plane probe packet;
send the data plane probe packet to at least one of the one or more network devices via the bidirectional data plane channel for transport through the computing network;
receive the data plane message from the one or more network devices of the computing network via the bidirectional data plane channel, the data plane message indicating the operation performed by the one or more network devices on the data plane probe packet; and
compare the operation indicated in the data plane message with a predefined operation associated with the one or more network devices to determine an operational status of the computing network.

10. The OAM server of claim 9, wherein the operation includes at least one of:
replicating the data plane probe packet;
ordering the data plane probe packet with respect to other data plane probe packets; and
eliminating at least one replication of the data plane probe packet.

11. The OAM server of claim 9, wherein the computer-executable instructions further cause the one or more processors to:
send the data plane probe packet to and receive the data plane message from the same network device of the one or more network devices.

12. The OAM server of claim 9, wherein the computer-executable instructions further cause the one or more processors to:
send the data plane probe packet to a first network device of the one or more network devices and receive the data plane message from a different, second network device of the one or more network devices.

13. The OAM server of claim 12, wherein the header of the probe packet includes an SID corresponding to the second network device.

14. The OAM server of claim 9, wherein the message indicates the operation performed on the data plane probe packet via an SID corresponding to the OAM server.

15. The OAM server of claim 9, wherein the header of the probe packet specifies an OAM timeslot for sending the probe packet to the at least one of the one or more network devices.

16. The OAM server of claim 9, wherein the comparing the operation results in determining that the operation matches the predefined operation and the operational status of the computing network is determined to be satisfactory.

17. A method comprising:
generating, at an operations, administration, and management (OAM) server, a data plane probe packet with a header including a segment identifier (SID) corresponding to a network device of a computing network, the SID corresponding to an instruction for the network device to send a data plane message to the OAM server indicating an operation performed on the data plane probe packet;
sending, from the OAM server, the data plane probe packet to the computing network for transport through the computing network;
receiving, at the OAM server, the data plane message from the network device via a bidirectional data plane channel, the data plane message indicating the operation performed by the network device on the data plane probe packet; and
comparing, by the OAM server, the operation indicated in the data plane message with a predefined operation associated with the network device to determine an operational status of the computing network.

18. The method of claim 17, wherein the computing network comprises a multi-hop and wireless mesh structure.

19. The method of claim 17, wherein the network device is a deterministic networking device.

20. The method of claim 17, wherein the bidirectional data plane channel utilizes a data plane of the computing network.

\* \* \* \* \*